United States Patent
Chen Larsson et al.

(10) Patent No.: US 11,711,861 B2
(45) Date of Patent: Jul. 25, 2023

(54) COMMUNICATION RESOURCE CONFIGURATIONS FOR COEXISTENCE

(71) Applicant: Telefonaktiebolaget LM Ericsson (publ), Stockholm (SE)

(72) Inventors: Daniel Chen Larsson, Lund (SE); Ravikiran Nory, San Jose, CA (US)

(73) Assignee: Telefonaktiebolaget LM Ericsson (Publ)

(*) Notice: Subject to any disclaimer, the term of this patent is extended or adjusted under 35 U.S.C. 154(b) by 90 days.

(21) Appl. No.: 17/044,948

(22) PCT Filed: Apr. 4, 2019

(86) PCT No.: PCT/EP2019/058556
§ 371 (c)(1),
(2) Date: Oct. 2, 2020

(87) PCT Pub. No.: WO2019/193116
PCT Pub. Date: Oct. 10, 2019

(65) Prior Publication Data
US 2021/0029764 A1    Jan. 28, 2021

Related U.S. Application Data

(60) Provisional application No. 62/653,955, filed on Apr. 6, 2018.

(51) Int. Cl.
*H04W 56/00* (2009.01)
*H04W 76/15* (2018.01)
(Continued)

(52) U.S. Cl.
CPC ........... *H04W 76/15* (2018.02); *H04L 1/1819* (2013.01); *H04L 5/1469* (2013.01);
(Continued)

(58) Field of Classification Search
CPC ............. H04W 76/15; H04W 72/0446; H04W 72/1257; H04W 88/06; H04L 1/1819; H04L 5/1469
(Continued)

(56) References Cited

U.S. PATENT DOCUMENTS

2015/0358977 A1* 12/2015 Seo ........................ H04W 72/00
455/452.1
2016/0021618 A1   1/2016 Yin et al.
(Continued)

FOREIGN PATENT DOCUMENTS

CN    107666727 A    2/2018
CN    104105220 B    3/2018
(Continued)

OTHER PUBLICATIONS

Russian Office Action and Search Report dated Dec. 30, 2020 for Application No. 2020136241/07 filed on Apr. 4, 2019, consisting of 9-pages.
(Continued)

*Primary Examiner* — Sai Ming Chan
(74) *Attorney, Agent, or Firm* — Christopher & Weisberg, P.A.

(57) ABSTRACT

Methods and apparatuses are disclosed for communication resource configurations for dual connectivity. In one embodiment, a wireless device is configured to receive an indication of a first Uplink-Downlink, UL-DL, configuration; compare the first UL-DL configuration to a reference UL-DL configuration and determine whether a communication direction of at least one communication resource indicated in the first UL-DL configuration matches a communication direction of at least one corresponding communication resource indicated by the reference UL-DL configuration; and based on the comparison of the reference
(Continued)

Option 3/3A

Option 4/4A

Option 7/7A

UL-DL configuration to the first UL-DL configuration, determine that the at least one communication resource is to be used for one of a Long Term Evolution, LTE, radio access network and a New Radio, NR, access network.

18 Claims, 8 Drawing Sheets

(51) Int. Cl.
| | |
|---|---|
| *H04L 1/1812* | (2023.01) |
| *H04L 5/14* | (2006.01) |
| *H04W 72/0446* | (2023.01) |
| *H04W 88/06* | (2009.01) |
| *H04W 72/50* | (2023.01) |

(52) U.S. Cl.
CPC ..... *H04W 72/0446* (2013.01); *H04W 72/535* (2023.01); *H04W 88/06* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2017/0034808 | A1* | 2/2017 | Ouchi | H04W 52/221 |
| 2018/0050575 | A1* | 2/2018 | Campbell | B60H 1/00978 |
| 2019/0281610 | A1* | 9/2019 | Choi | H04W 72/0446 |

FOREIGN PATENT DOCUMENTS

| | | |
|---|---|---|
| GB | 2554512 A | 4/2018 |
| JP | 2016530749 A | 9/2016 |
| RU | 2642831 C1 | 1/2018 |
| WO | 2015108388 A1 | 7/2015 |
| WO | 2016021890 A1 | 2/2016 |

OTHER PUBLICATIONS

International Search Report dated Jul. 19, 2019 for International Application No. PCT/EP2019/058556 filed on Apr. 4, 2019, consisting of 10-pages.
Japanese Office Action, Search Report and English translation dated Dec. 21, 2021 for Application No. 2020-554909 filed on Dec. 13, 2021, consisting of 12 pages.
3GPP TSG-RAN WG2 #83bis Tdoc R2-133366; Title: RAN2 Impacts of eIMTA; Agenda Item: 7.8; Source: Ericsson; Document for: Discussion, Decision; Date and Location: Oct. 7-11, 2013, Ljubljana, Slovenia; consisting of 7 pages.
3GPP TSG-RAN WG1 Meeting #92 R1-1802419; Title: Further consideration on NR-LTE co-existence; Source: Intel Corporation; Agenda item: 7.1.5; Document for: Discussion and Decision; Date and Location: Feb. 26-Mar. 2, 2018, Athens, Greece; consisting of 4 pages.
3GPP TSG RAN WG1 #91, R1-1721555; Title: On UL power sharing for coverage enhancement; Orange, NTT Docomo, At & T, China Telecom, China Unicom, DT, Verizon, Bouygues Telecom, Huawei, ZTE, Ericsson, CATT, OPPO, Vivo, Xiaomi, Appl; Dec. 1, 2017; consisting of 5 pages.
3GPP TSG RAN WG1 #87 R1-1613034; Title: LTE-NR Coexistence; Agenda item: 7.1.7; Source: Samsung; Document for: Discussion and Decision; Date and Location: Nov. 14-18, 2016, Reno, USA; consisting of 3 pages.
Korean Office Action and English machine translation dated Feb. 28, 2022 for Application No. 10-2020-7032112 filed on Nov. 6, 2020, consisting of 12 pages.
3GPP TSG RAN WG1 Meeting #88 R1-1704778; Title: On NR-LTE coexistence; Agenda item: 8.1.8; Source: Intel Corporation; Document for: Discussion and Decision; Date and Location: Apr. 3-7, 2017, Spokane, USA; consisting of 5 pages.
Indian Office Action dated Dec. 3, 2021 for Application No. 202017044552 filed on Oct. 13, 2020, consisting of 7 pages.

* cited by examiner

Option 3/3A

Option 4/4A

Option 7/7A

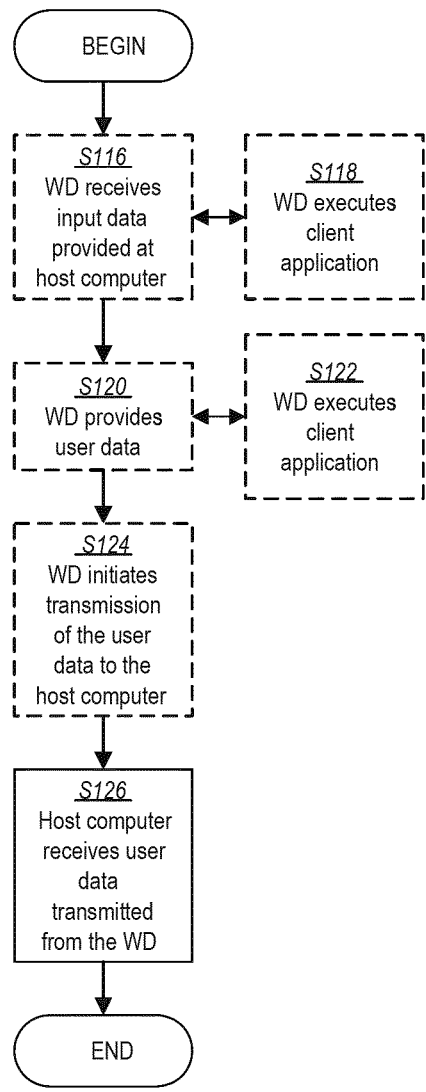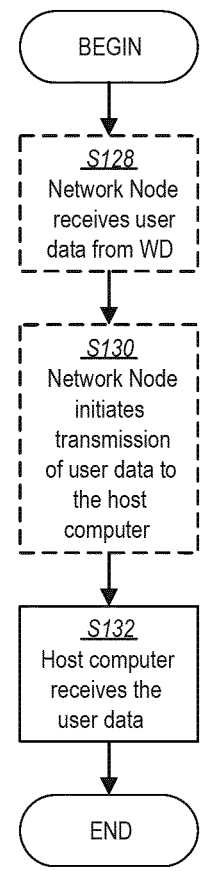
FIG. 7
FIG. 8

COMMUNICATION RESOURCE CONFIGURATIONS FOR COEXISTENCE

CROSS-REFERENCE TO RELATED APPLICATIONS

This application is a Submission Under 35 U.S.C. § 371 for U.S. National Stage Patent Application of International Application No.: PCT/EP2019/058556, filed Apr. 4, 2019 entitled "COMMUNICATION RESOURCE CONFIGURATIONS FOR DUAL CONNECTIVITY," which claims priority to U.S. Provisional Application No. 62/653,955, filed Apr. 6, 2018, entitled "COMMUNICATION RESOURCE CONFIGURATIONS FOR CO-EXISTENCE OPERATIONS FOR TDD AND/OR CARRIER AGGREGATION," the entireties of both of which are incorporated herein by reference.

TECHNICAL FIELD

The present disclosure relates to wireless communications, and in particular, to methods and apparatuses for configuring resources for dual connectivity.

BACKGROUND

Dual connectivity implies a device is simultaneously connected to two cells. FIG. 1 depicts some example dual connectivity architectures where the dual connectivity is provided by LTE and NR base stations.

For power control purposes and/or for purposes of being able to operate at a given time on a wireless communication network, such as, for example, New Radio (NR) or Long-Term Evolution (LTE) (e.g., a single transmission (Tx) operation), it has been considered to define a specific set of Hybrid Automatic Repeat Request (HARQ) and scheduling timings. However, the scheduling timings that have been considered only cover single carrier operation and Frequency Division Duplex (FDD) carriers on the LTE side. This may correspond to the architecture option 3/3A (see FIG. 1) being used, which is typically when LTE is the Master Cell Group (MCG) and NR is the Secondary Cell Group (SCG).

One solution that has been considered is that the wireless device (e.g., user equipment (UE)) for downlink (DL), i.e., from the network node, e.g., base station to the wireless device, purposes on the LTE side can be configured with a Time Division Duplex (TDD) HARQ timing reference configuration. This could contain the HARQ bits for feedback to specific uplink (UL), i.e., from the wireless device to the network node, e.g., base station, subframes (e.g., the ones given by the UL/DL configuration). This may imply that a FDD carrier may start to operate HARQ-ACK timing as a TDD carrier. The wireless device may assume that the time occasion wherein the UL subframes given by the TDD UL/DL configuration is only used for LTE transmission in UL. Further, at all other occasions the wireless device may assume that NR can transmit in the UL.

To ensure the UL scheduling of Physical Uplink Shared Channel (PUSCH) ends up in these occasions on the LTE side it has been considered that a 10 ms Round Trip Time (RTT) may be used.

For a wireless device operating in E-UTRAN New Radio-Dual Connectivity (EN-DC), when configured with Case 1 HARQ timing on an FDD Primary Cell (PCell), one considered solution may include the following specifications:

No changes to the current Downlink Control Information (DCI) format size for formats DCI 0 and 1A in the CSS; wireless device does not use Physical HARQ Indicator Channel (PHICH);

The UL scheduling/HARQ timing is as follows:
PUSCH HARQ Round-Trip Time (RTT) is 10 ms;
UL grant in subframe n scheduled PUSCH in subframe n+4, and the UL grant for the same UL HARQ process occurs in subframe n+10;

Note: This may supersede previous agreements on the scheduling/HARQ timing for the UL;
The Downlink Assignment Indicator (DAI) field and the HARQ process number field in DCI formats in the USS follows the design of FDD Secondary Cell (SCell) with TDD PCell;
Support Physical Uplink Control Channel (PUCCH) format 3/4/5 procedures for HARQ-ACK feedback as in LTE FDD SCell with a TDD PCell, with the following exceptions:
The PUCCH format 1a/1b resource corresponding to a Physical Downlink Shared Channel (PDSCH) scheduled with a DCI is derived based on the resource determination procedure for FDD;
A wireless device is not expected to receive both unicast PDSCH scheduled by CSS and unicast PDSCH scheduled by USS within a HARQ-ACK bundling window;
If a unicast PDSCH is scheduled in CSS, wireless device assumes DAI=1;
Note: In some cases, the above may not change a specification that LTE UL transmissions only occur in the UL subframes (not including special subframes) of the reference UL/DL configuration;
Note: In some cases, the PDSCH-to-HARQ feedback timing may follow the reference UL/DL configuration, for DL assignments in both CSS and USS.

Some NR-LTE Dual connectivity architecture options are shown in FIG. 1, namely options 3/3A, 4/4A and 7/7A in accordance with some of the standalone "LTE-assisted" or "NR assisted" 3GPP scenarios.

NR-LTE Coexistence

NR base station (BS) (e.g., gNB) can be geographically co-located with LTE BS (e.g., eNB) or they can be located at different sites. In both cases, the NR and LTE can coexist on the same carrier frequency or on neighbor frequencies.

One of the problems with existing solutions is that current solutions that have been considered do not provide any solution in cases where the LTE carrier operates in TDD. Neither do existing solutions address cases where multiple carriers are configured on the LTE side. In particular, existing solutions do not address a case where there is a mix of carriers on the LTE side operating both in FDD and TDD.

SUMMARY

Some embodiments advantageously provide methods and apparatuses for deriving the applicable UL subframes and corresponding UL slots for LTE and NR when they are operated in Dual Connectivity (DC) mode. Some such embodiments provide that the wireless device is configured by the base station with a reference UL/DL configuration that is compared to a configured UL/DL configuration, for example via the System Information Block 1 (SIB1). The UL subframes that have the same direction (e.g., both UL or both DL communication directions, in other words, the communication direction of the subframe/slot of the reference UL/DL configuration match the communication direction of the subframe/slot of the corresponding (e.g. SIB1)

configured UL/DL configuration) in both configurations may be used for UL for LTE. For time instances when there is a difference between the configurations between UL and DL subframes, the wireless device may assume that the subframes are not used by LTE and are correspondingly used for NR.

In some embodiments, the mechanism for configuring a UL/DL reference configuration according to embodiments in the disclosure may be used for and/or extended to Carrier Aggregation (CA) operation on the LTE side. The same mechanisms may be useful and beneficial for CA.

Some embodiments may advantageously enable the ability to configure the case 1 timing for multi-carrier operation on the LTE side and also if the LTE carriers operate TDD. In some embodiments, this could enable higher power to be used in the UL if the wireless device does not support dynamic power sharing. Hence, the coverage of both the LTE and NR side can become greater.

According to one aspect of the present disclosure, a wireless device for communicating with a network node is provided. The wireless device comprises processing circuitry, the processing circuitry configured to, for a dual connectivity mode of the wireless device: receive an indication of a first Uplink-Downlink, UL-DL, configuration; compare the first UL-DL configuration to a reference UL-DL configuration and determine whether a communication direction of at least one communication resource indicated in the first UL-DL configuration matches a communication direction of at least one corresponding communication resource indicated by the reference UL-DL configuration; and based on the comparison of the reference UL-DL configuration to the first UL-DL configuration, determine that the at least one communication resource is to be used for one of a Long Term Evolution, LTE, radio access network and a New Radio, NR, access network.

In some embodiments of this aspect, the processing circuitry is further configured to receive the first UL-DL configuration, for example in a System Information Block Type 1, SIB1, message. In some embodiments of this aspect, the reference UL-DL configuration comprises a Long Term Evolution, LTE, reference configuration. In some embodiments of this aspect, the at least one communication resource comprises a slot or a subframe indicated by the first UL-DL configuration and the reference UL-DL configuration. In some embodiments of this aspect, the processing circuitry is further configured to receive an indication of the reference UL-DL configuration. In some embodiments of this aspect, the processing circuitry is further configured to compare the reference UL-DL configuration to the first UL-DL configuration by being configured to determine whether the communication direction of the at least one communication resource indicated by the first UL-DL configuration and the communication direction of the at least one corresponding communication resource indicated by the reference UL-DL configuration are both Uplink, UL, directions.

In some embodiments of this aspect, the processing circuitry is further configured to determine the configuration of the at least one communication resource by being configured to: if the communication direction of the at least one communication resource indicated by the first UL-DL configuration and the communication direction of the at least one corresponding communication resource indicated by the reference UL-DL configuration are both Uplink, UL, directions, determine that the at least one communication resource is an UL resource for a Long Term Evolution, LTE, radio access network; if neither the communication direction of the at least one communication resource indicated by the first UL-DL configuration nor the communication direction of the at least one corresponding communication resource indicated by the reference UL-DL configuration are UL directions, determine that the at least one communication resource is a DL resource; and if the communication direction of the at least one communication resource indicated by the first UL-DL configuration is an UL direction and the communication direction of the at least one corresponding communication resource indicated by the reference UL-DL configuration is not an UL direction, determine that the at least one communication resource is an UL resource for a New Radio, NR, access network.

In some embodiments of this aspect, the processing circuitry is further configured to determine the configuration of the at least one communication resource by being configured to, based on the comparison of the reference UL-DL configuration to the first UL-DL configuration, determine a Hybrid Automatic Repeat reQuest, HARQ, timing. In some embodiments of this aspect, the reference UL-DL configuration indicates one of a plurality of Time Division Duplex, TDD, configuration patterns.

According to another aspect of the present disclosure, a method in a wireless device, the method comprising, for a dual connectivity mode of the wireless device: receiving an indication of a first Uplink-Downlink, UL-DL, configuration; comparing the first UL-DL configuration to a reference UL-DL configuration to determine whether a communication direction of at least one communication resource indicated by the first UL-DL configuration matches a communication direction of at least one corresponding communication resource indicated by the reference UL-DL configuration; and based on the comparison of the reference UL-DL configuration to the first UL-DL configuration, determining that the at least one communication resource is to be used for one of a Long Term Evolution, LTE, radio access network and a New Radio, NR, access network.

In some embodiments of this aspect, the receiving the first UL-DL configuration further comprises receiving the first UL-DL configuration, for example, in a System Information Block Type 1, SIB1, message. In some embodiments of this aspect, the reference UL-DL configuration comprises a Long Term Evolution, LTE, reference configuration. In some embodiments of this aspect, the at least one communication resource comprises a slot or a subframe indicated by the first UL-DL configuration and the reference UL-DL configuration. In some embodiments of this aspect, the method further comprises receiving an indication of the reference UL-DL configuration. In some embodiments of this aspect, the comparing the reference UL-DL configuration to the first UL-DL configuration further comprises: determining whether the communication direction of the at least one communication resource indicated by the first UL-DL configuration and the communication direction of the at least one corresponding communication resource indicated by the reference UL-DL configuration are both Uplink, UL, directions.

In some embodiments of this aspect, the determining the configuration of the at least one communication resource further comprises: if the communication direction of the at least one communication resource indicated by the first UL-DL configuration and the communication direction of the at least one corresponding communication resource indicated by the reference UL-DL configuration are both Uplink, UL, directions, determining that the at least one communication resource is an UL resource for a Long Term Evolution, LTE, radio access network; if neither the communication direction of the at least one communication resource indicated by the first UL-DL configuration nor the communication direction of the at least one corresponding communication resource indicated by the reference UL-DL configuration are UL directions, determining that the at least one communication resource is a downlink, DL, resource; and if the communication direction of the at least one communication resource indicated by the first UL-DL configuration is an UL direction and the communication direction of the at least one corresponding communication resource indicated by the reference UL-DL configuration is not an UL direction, determining that the at least one communication resource is an UL resource for a New Radio, NR, access network.

In some embodiments of this aspect, the determining the configuration of the at least one communication resource further comprises, based on the comparison of the reference UL-DL configuration to the first UL-DL configuration, determining a Hybrid Automatic Repeat reQuest, HARQ, timing. In some embodiments of this aspect, the reference UL-DL configuration indicates one of a plurality of Time Division Duplex, TDD, configuration patterns.

In yet another aspect of the present disclosure, a network node configured to communicate with a wireless device when the wireless device is in dual connectivity mode is provided. The network node comprising processing circuitry, the processing circuitry configured to determine the wireless device scheduling to use at least one communication resource for one of a Long Term Evolution, LTE, radio access network and a New Radio, NR, access network based at least in part on a comparison of a first Uplink-Downlink, UL-DL, configuration to a reference UL-DL configuration.

In some embodiments of this aspect, the processing circuitry is further configured to communicate the first UL-DL configuration, for example, in a System Information Block Type 1, SIB1, message. In some embodiments of this aspect, the reference UL-DL configuration comprises a Long Term Evolution, LTE, reference configuration. In some embodiments of this aspect, the at least one communication resource comprises a slot or a subframe indicated by the first UL-DL configuration and the reference UL-DL configuration. In some embodiments of this aspect, the processing circuitry is further configured to communicate, to the wireless device, an indication of the first Uplink-Downlink, UL-DL, configuration; select the reference UL-DL configuration, the reference UL-DL configuration allowing the wireless device to determine, based on a comparison of the first UL-DL configuration to the reference UL-DL configuration, which one of the LTE radio access network and the NR radio access network to use for the at least one scheduled communication resource; and communicate, to the wireless device, an indication of the reference UL-DL configuration. In some embodiments of this aspect, the processing circuitry is further configured to select the reference UL-DL configuration by being configured to select the reference UL-DL configuration based at least in part on whether a communication direction of the at least one communication resource indicated by the first UL-DL configuration matches a communication direction of the at least one corresponding communication resource indicated by the reference UL-DL configuration.

In some embodiments of this aspect, the processing circuitry is further configured to select the reference UL-DL configuration being configured to: if the at least one communication resource is to be an Uplink, UL, resource for a Long Term Evolution, LTE, radio access network, select the reference UL-DL configuration indicating the communication direction of the at least one communication resource that matches the communication direction of the corresponding at least one communication resource indicated by the first UL-DL configuration; and if the at least one communication resource is to be an UL resource for a New Radio, NR, access network, select the reference UL-DL configuration indicating the communication direction of the at least one communication resource that does not match the communication direction of the corresponding at least one communication resource indicated by the first UL-DL configuration. In some embodiments of this aspect, the reference UL-DL configuration further configures a Hybrid Automatic Repeat reQuest, HARQ, timing for the wireless device. In some embodiments of this aspect, the reference UL-DL configuration indicates one of a plurality of Time Division Duplex, TDD, configuration patterns.

In yet another aspect of the present disclosure, a method in a network node is provided. The method comprises determining a wireless device scheduling to use at least one communication resource for one of a Long Term Evolution, LTE, radio access network and a New Radio, NR, access network based at least in part on a comparison of a first Uplink-Downlink, UL-DL, configuration to a reference UL-DL configuration.

In some embodiments of this aspect, the method further comprises communicating an indication of the first UL-DL configuration, for example, in a System Information Block Type 1, SIB1, message. In some embodiments of this aspect, the reference UL-DL configuration comprises a Long Term Evolution, LTE, reference configuration. In some embodiments of this aspect, the at least one communication resource comprises a slot or a subframe indicated by the first UL-DL configuration and the reference UL-DL configuration. In some embodiments of this aspect, the method further comprises communicating, to the wireless device, an indication of the first Uplink-Downlink, UL-DL, configuration; selecting the reference UL-DL configuration, the reference UL-DL configuration allowing the wireless device to determine, based on a comparison of the first UL-DL configuration to the reference UL-DL configuration, which one of the LTE radio access network and the NR radio access network to use for the at least one scheduled communication resource; and communicating, to the wireless device, an indication of the reference UL-DL configuration. In some embodiments of this aspect, the selecting the reference UL-DL configuration further comprises selecting the reference UL-DL configuration based at least in part on whether a communication direction of the at least one communication resource indicated by the first UL-DL configuration matches a communication direction of the at least one corresponding communication resource indicated by the reference UL-DL configuration.

In some embodiments of this aspect, the selecting the reference UL-DL further comprises: if the at least one communication resource is to be an Uplink, UL, resource for a Long Term Evolution, LTE, radio access network, selecting the reference UL-DL configuration indicating the communication direction of the at least one communication resource that matches the communication direction of the corresponding at least one communication resource indicated by the first UL-DL configuration; and if the at least one communication resource is to be an UL resource for a New Radio, NR, access network, selecting the reference UL-DL configuration indicating the communication direction of the at least one communication resource that does not match the communication direction of the corresponding at least one communication resource indicated by the first UL-DL configuration. In some embodiments of this aspect, the reference UL-DL configuration further configures a Hybrid Automatic Repeat reQuest, HARQ, timing for the wireless device. In some embodiments of this aspect, the reference UL-DL configuration indicates one of a plurality of Time Division Duplex, TDD, configuration patterns.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
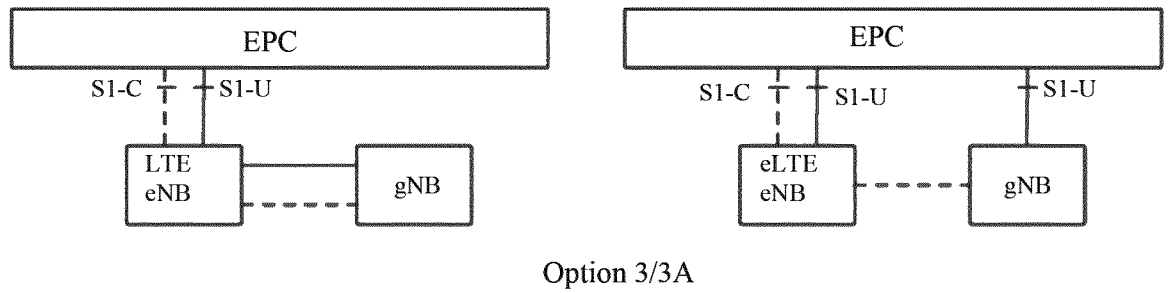
FIG. 1 is a block diagram of exemplary NR-LTE Dual Connectivity architecture options.
Figure 1:
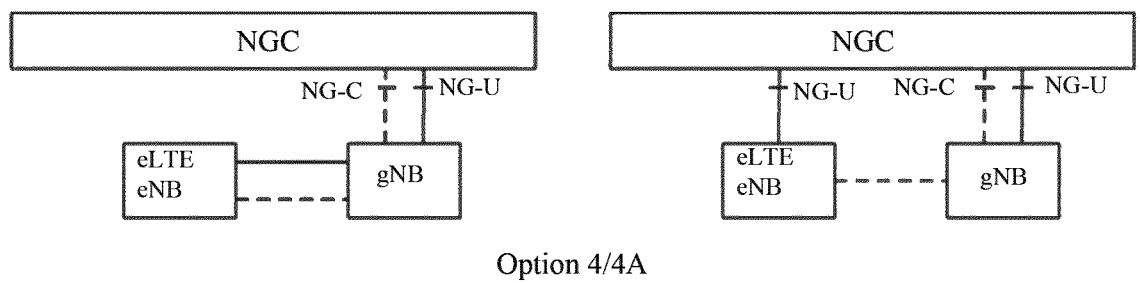
Figure 1:
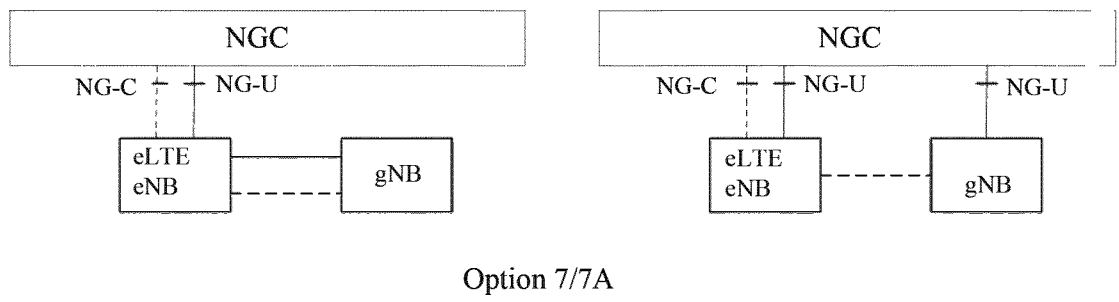
Figure 2:
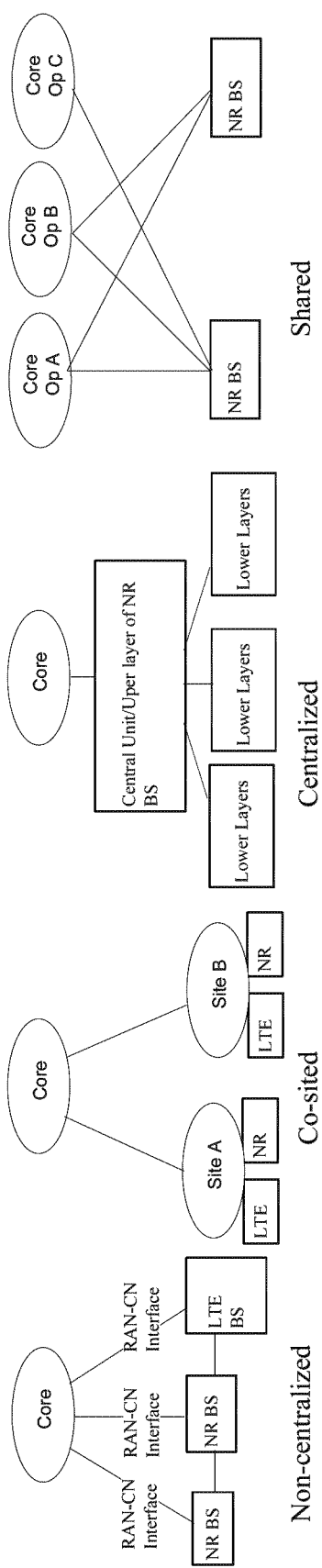
FIG. 2 is a block diagram of example NR deployments.

Examples of NR deployment scenarios are also shown in FIG. 2. When NR and LTE coexistence is employed in a TDD system on the same or neighbor frequencies (e.g., LTE and NR in the same area such as in co-located NR and LTE BSs) they may use the same TDD configuration which includes the Timing Advance (TA) offset, to minimize interference.

One example is that the unused resources within the LTE carrier can be used for transmitted NR signals. This in particular can be used in a UL carrier. There are at least two cases of this NR-LTE coexistence in UL: wireless device transparent and wireless device non-transparent. In the former case, the same UL carrier is shared between LTE and NR by two different wireless devices (e.g., wireless device1 transmits using LTE while wireless device2 transmits using NR). In the latter case, the same UL carrier is used by the same wireless device for transmitting both LTE and NR signals (e.g., similar to UL Carrier Aggregation (CA)).

Some embodiments described herein advantageously provide methods and apparatuses for deriving the applicable UL subframes and corresponding UL slots for LTE and NR, when NR and LTE coexistence is employed in a TDD system on the same or neighbor frequencies and when they are operated in Dual Connectivity (DC) mode.

Before describing in detail exemplary embodiments, it is noted that the embodiments reside primarily in combinations of apparatus components and processing steps related to communication resource configurations for co-existence operations for TDD and/or CA. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (wireless device) such as a wireless device (wireless device) or a radio network node.

In some embodiments, the non-limiting terms wireless device (wireless device) or a user equipment (UE) are used interchangeably. The wireless device herein can be any type of wireless device capable of communicating with a network node or another wireless device over radio signals, such as wireless device (wireless device). The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In some embodiments, the term "pattern" and "subframe pattern" and "slot pattern" are used interchangeably for TDD UL/DL configurations to indicate a time resource pattern of time resources in, for example, a frame being configured with resources for UL and DL communications.

In some embodiments, the UL/DL configuration may specify the UL-DL configuration of a TDD frame. In some embodiments, the uplink-downlink configuration determines which subframes are configured as downlink, which are uplink, and which are special subframes, in, for example, LTE. In some embodiments, there are seven uplink-downlink configurations in, for example, LTE.

In some embodiments, a reference UL/DL configuration is intended to indicate a resource configuration that is different and/or separate from typical UL/DL configurations for TDD that may be sent as e.g., system information. In some embodiments, the reference UL/DL configuration is intended to be used to compare to typical UL/DL configuration from an LTE BS and a NR BS to determine whether an UL resource should be configured for LTE only or for the NR only so as to have non-overlapping time resource configurations in TDD.

In some embodiments, the term communication resource is intended to indicate either a frequency resource for e.g., CA, and/or a time resource for e.g., DC. In some embodiments, the term communication resource is intended to indicate a slot and/or a subframe.

In some embodiments, the term communication direction is intended to indicate an UL communication direct (i.e., communications from the wireless device to the network node) and/or a DL communication direction (i.e., communications in a direction from the network node to the wireless device).

The term time resource used herein may correspond to any type of physical resource or radio resource expressed in terms of length of time. Examples of time resources are: symbol, time slot, subframe, radio frame, TTI, interleaving time, etc. As used herein, in some embodiments, the terms "subframe," "slot," subframe/slot" and "time resource" are used interchangeably and are intended to indicate a time resource and/or a time resource number.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Configuring a radio node, in particular a terminal or user equipment or the wireless device 22, may refer to the radio node being adapted or caused or set and/or instructed to operate according to the configuration. Configuring may be done by another device, e.g., a network node 16 (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node 16. A network node 16 may use, and/or be adapted to use, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. wireless device 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. wireless device 22) may comprise configuring the wireless device 22 to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the present disclosure provide methods and apparatuses for deriving the applicable UL subframes and corresponding UL slots for LTE and NR when they are operated in Dual Connectivity mode. Such embodiments may provide that the wireless device is configured by the base station with a reference UL/DL configuration that is compared to a configured UL/DL configuration, for example via System Information Block 1 (SIB1). The UL subframes that have the same direction in both configurations may be used for UL for LTE. For time resources (e.g., time slot numbers and/or subframe numbers)

when there is a difference between the configurations between UL and DL subframes (e.g., opposite communication directions in different UL/DL configurations), the wireless device may assume that the subframes are not used by LTE and are correspondingly used for NR.

In a some embodiments, the mechanism of configuring a UL/DL reference configuration may be instead used by and/or may be extended to CA operation on the LTE side. The same mechanisms may be useful and beneficial for CA operation.

Figure 3:
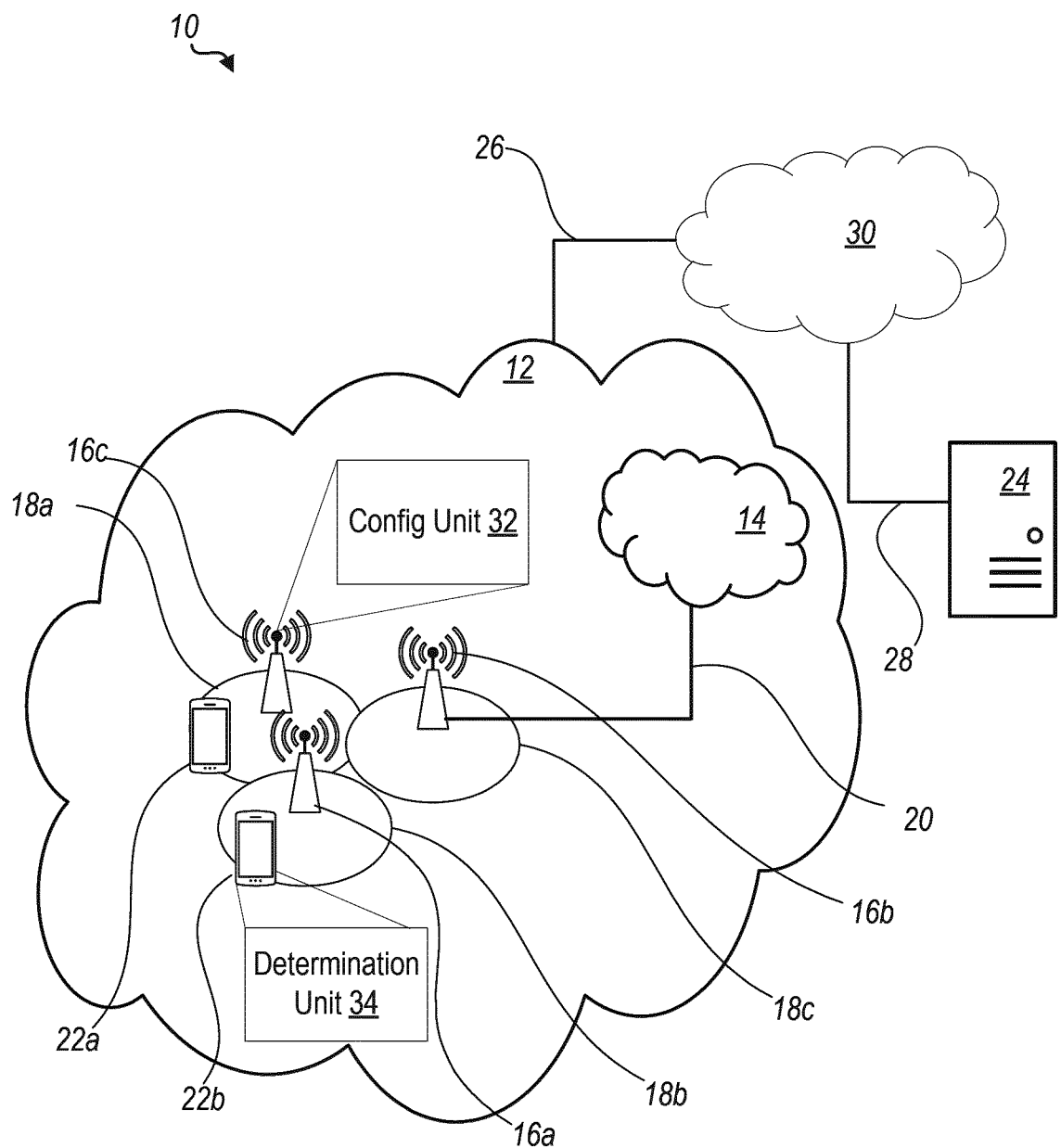
FIG. 3 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (wireless device) 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a configuration unit 32 which is configured to determine the wireless device scheduling to use at least one communication resource for one of a Long Term Evolution, LTE, radio access network and a New Radio, NR, access network based at least in part on a comparison of a first Uplink-Downlink, UL-DL, configuration to a reference UL-DL configuration. In another embodiment, configuration unit 32 is configured to communicate, to the wireless device 22, a first Uplink-Downlink (UL-DL) configuration and a second UL-DL configuration, the second UL-DL configuration being a reference UL-DL configuration for configuring at least one communication resource associated with the wireless device as one of an UL resource and a DL resource. In some embodiments, the at least one communication resource is at least one time resource and the communication to the wireless device 22 is for configuring the at least one time resource as one of an UL time resource and a DL time resource in a Time Division Duplex (TDD) frame. In some embodiments, the at least one communication resource is at least one time resource and the communication to the wireless device 22 is for configuring the at least one time resource as one of an UL time resource and a DL time resource in a Time Division Duplex (TDD) frame for scheduling non-overlapping communications when the wireless device 22 is in a Dual Connectivity (DC) mode. In some embodiments, the configuration unit 32 is further configured to select the reference UL-DL configuration from a table of a plurality of UL-DL configurations based at least on whether a communication direction of the at least one time resource in the first UL-DL configuration and the second UL-DL configuration matches. In some embodiments, the at least one communication resource is at least one frequency resource and the communication to the wireless device 22 is for configuring the at least one frequency resource for scheduling non-overlapping communications when the wireless device 22 is in a Carrier Aggregation (CA) mode.

A wireless device 22 is configured to include a determination unit 34 which is configured to receive an indication of a first Uplink-Downlink, UL-DL, configuration; compare the first UL-DL configuration to a reference UL-DL configuration and determine whether a communication direction of at least one communication resource indicated in the first UL-DL configuration matches a communication direction of at least one corresponding communication resource indicated by the reference UL-DL configuration; and based on the comparison of the reference UL-DL configuration to the first UL-DL configuration, determine that the at least one communication resource is to be used for one of a Long Term Evolution, LTE, radio access network and a New Radio, NR, access network. In another embodiment, determination unit 34 is configured to receive, from a network node 16, a first Uplink-Downlink (UL-DL) configuration and a second UL-DL configuration, the second UL-DL configuration being a reference UL-DL configuration; and determine that at least one communication resource for the wireless device 22 is one of an UL resource and a DL resource based on a comparison of at least the first UL-DL configuration and the reference UL-DL configuration. In some embodiments, the at least one communication resource is at least one time resource and the determination unit 34 is configured to determine that the at least one time resource is one of an UL time resource and a DL time resource in a Time Division Duplex (TDD) frame. In some embodiments, the at least one communication resource is at least one time resource and the determination unit 34 is configured to determine that the at least one time resource is one of an UL time resource and a DL time resource in a Time Division Duplex (TDD) frame for scheduling non-overlapping communications when the wireless device is in a Dual Connectivity (DC) mode. In some embodiments, the determination unit 34 is further configured to compare the reference UL-DL configuration to the first UL-DL configuration to determine whether a communication direction of the at least one time resource in the first UL-DL configuration and the second UL-DL configuration matches. In some embodiments, the at least one communication resource is at least one frequency resource and the determination unit 34 is configured to determine a frequency corresponding to the at least one frequency resource for scheduling non-overlapping communications when the wireless device is in a Carrier Aggregation (CA) mode.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include a communication unit 54 configured to enable the service provider to observe, monitor, control, transmit to and/or receive from the network node 16 and/or the wireless device 22.

The communication system 10 further includes a network node 16 provided in a communication system 10 and comprising hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to determine the wireless device 22 scheduling to use at least one communication resource for one of a Long Term Evolution, LTE, radio access network and a New Radio, NR, access network based at least in part on a comparison of a first Uplink-Downlink, UL-DL, configuration to a reference UL-DL configuration.

In some embodiments, the processing circuitry 68 is further configured to communicate the first UL-DL configuration, for example in a System Information Block Type 1, SIB1, message. In some embodiments, the reference UL-DL configuration comprises a Long Term Evolution, LTE, reference configuration. In some embodiments, the at least one communication resource comprises a slot or a subframe indicated by the first UL-DL configuration and the reference UL-DL configuration. In some embodiments, the processing circuitry 68 is further configured to: communicate, to the wireless device 22, an indication of the first Uplink-Downlink, UL-DL, configuration; select the reference UL-DL configuration, the reference UL-DL configuration allowing the wireless device 22 to determine, based on a comparison of the first UL-DL configuration to the reference UL-DL configuration, which one of the LTE radio access network and the NR radio access network to use for the at least one scheduled communication resource; and communicate, to the wireless device 22, an indication of the reference UL-DL configuration. In some embodiments, the processing circuitry 68 is further configured to select the reference UL-DL configuration by being configured to: select the reference UL-DL configuration based at least in part on whether a communication direction of the at least one communication resource indicated by the first UL-DL configuration matches a communication direction of the at least one corresponding communication resource indicated by the reference UL-DL configuration.

In some embodiments, the processing circuitry 68 is further configured to select the reference UL-DL configuration being configured to: if the at least one communication resource is to be an Uplink, UL, resource for a Long Term Evolution, LTE, radio access network, select the reference UL-DL configuration indicating the communication direction of the at least one communication resource that matches the communication direction of the corresponding at least one communication resource indicated by the first UL-DL configuration; and if the at least one communication resource is to be an UL resource for a New Radio, NR, access network, select the reference UL-DL configuration indicating the communication direction of the at least one communication resource that does not match the communication direction of the corresponding at least one communication resource indicated by the first UL-DL configuration. In some embodiments, the reference UL-DL configuration further configures a Hybrid Automatic Repeat reQuest, HARQ, timing for the wireless device 22. In some embodiments, the reference UL-DL configuration indicates one of a plurality of Time Division Duplex, TDD, configuration patterns.

In another embodiment, network node 16 may include configuration unit 32 configured to communicate, to the wireless device 22, a first Uplink-Downlink (UL-DL) configuration and a second UL-DL configuration, the second UL-DL configuration being a reference UL-DL configuration for configuring at least one communication resource associated with the wireless device as one of an UL resource and a DL resource. In some embodiments, the at least one communication resource is at least one time resource and the communication to the wireless device 22 is for configuring the at least one time resource as one of an UL time resource and a DL time resource in a Time Division Duplex (TDD) frame. In some embodiments, the at least one communication resource is at least one time resource and the communication to the wireless device 22 is for configuring the at least one time resource as one of an UL time resource and a DL time resource in a Time Division Duplex (TDD) frame for scheduling non-overlapping communications when the wireless device is in a Dual Connectivity (DC) mode. In some embodiments, the processing circuitry 68 is further configured to select the reference UL-DL configuration from a table of a plurality of UL-DL configurations based at least on whether a communication direction of the at least one time resource in the first UL-DL configuration and the second UL-DL configuration matches. In some embodiments, the at least one communication resource is at least one frequency resource and the communication to the wireless device 22 is for configuring the at least one frequency resource for scheduling non-overlapping communications when the wireless device 22 is in a Carrier Aggregation (CA) mode.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a determination unit 34 configured to receive an indication of a first Uplink-Downlink, UL-DL, configuration; compare the first UL-DL configuration to a reference UL-DL configuration and determine whether a communication direction of at least one communication resource indicated in the first UL-DL configuration matches a communication direction of at least one corresponding communication resource indicated by the reference UL-DL configuration; and based on the comparison of the reference UL-DL configuration to the first UL-DL configuration, determine that the at least one communication resource is to be used for one of a Long Term Evolution, LTE, radio access network and a New Radio, NR, access network.

In some embodiments, the processing circuitry 84 is further configured to receive the first UL-DL configuration, for example, in a System Information Block Type 1, SIB1, message. In some embodiments, the reference UL-DL configuration comprises a Long Term Evolution, LTE, reference configuration. In some embodiments, the at least one communication resource comprises a slot or a subframe indicated by the first UL-DL configuration and the reference UL-DL configuration. In some embodiments, the processing circuitry 84 is further configured to receive an indication of the reference UL-DL configuration. In some embodiments, the processing circuitry 84 is further configured to compare the reference UL-DL configuration to the first UL-DL configuration by being configured to determine whether the communication direction of the at least one communication resource indicated by the first UL-DL configuration and the communication direction of the at least one corresponding communication resource indicated by the reference UL-DL configuration are both Uplink, UL, directions.

In some embodiments, the processing circuitry 84 is further configured to determine the configuration of the at least one communication resource by being configured to: if the communication direction of the at least one communication resource indicated by the first UL-DL configuration and the communication direction of the at least one corresponding communication resource indicated by the reference UL-DL configuration are both Uplink, UL, directions, determine that the at least one communication resource is an UL resource for a Long Term Evolution, LTE, radio access network; if neither the communication direction of the at least one communication resource indicated by the first UL-DL configuration nor the communication direction of the at least one corresponding communication resource indicated by the reference UL-DL configuration are UL directions, determine that the at least one communication resource is a DL resource; and if the communication direction of the at least one communication resource indicated by the first UL-DL configuration is an UL direction and the communication direction of the at least one corresponding communication resource indicated by the reference UL-DL configuration is not an UL direction, determine that the at least one communication resource is an UL resource for a New Radio, NR, access network.

In some embodiments, the processing circuitry 84 is further configured to determine the configuration of the at least one communication resource by being configured to, based on the comparison of the reference UL-DL configuration to the first UL-DL configuration, determine a Hybrid Automatic Repeat reQuest, HARQ, timing. In some embodiments, the reference UL-DL configuration indicates one of a plurality of Time Division Duplex, TDD, configuration patterns.

In another embodiment, wireless device 22 may include a determination unit 34 configured to receive, from a network node 16, a first Uplink-Downlink (UL-DL) configuration and a second UL-DL configuration, the second UL-DL configuration being a reference UL-DL configuration; and determine that at least one communication resource for the wireless device 22 is one of an UL resource and a DL resource based on a comparison of at least the first UL-DL configuration and the reference UL-DL configuration.

In some embodiments, the at least one communication resource is at least one time resource and the processing circuitry 84 is configured to determine that the at least one time resource is one of an UL time resource and a DL time resource in a Time Division Duplex (TDD) frame. In some embodiments, the at least one communication resource is at least one time resource and the processing circuitry 84 is configured to determine that the at least one time resource is one of an UL time resource and a DL time resource in a Time Division Duplex (TDD) frame for scheduling non-overlapping communications when the wireless device 22 is in a Dual Connectivity (DC) mode. In some embodiments, the processing circuitry 84 is further configured to compare the reference UL-DL configuration to the first UL-DL configuration to determine whether a communication direction of the at least one time resource in the first UL-DL configuration and the second UL-DL configuration matches. In some embodiments, the at least one communication resource is at least one frequency resource and the processing circuitry 84 is configured to determine a frequency corresponding to the at least one frequency resource for scheduling non-overlapping communications when the wireless device 22 is in a Carrier Aggregation (CA) mode.

Figure 4:
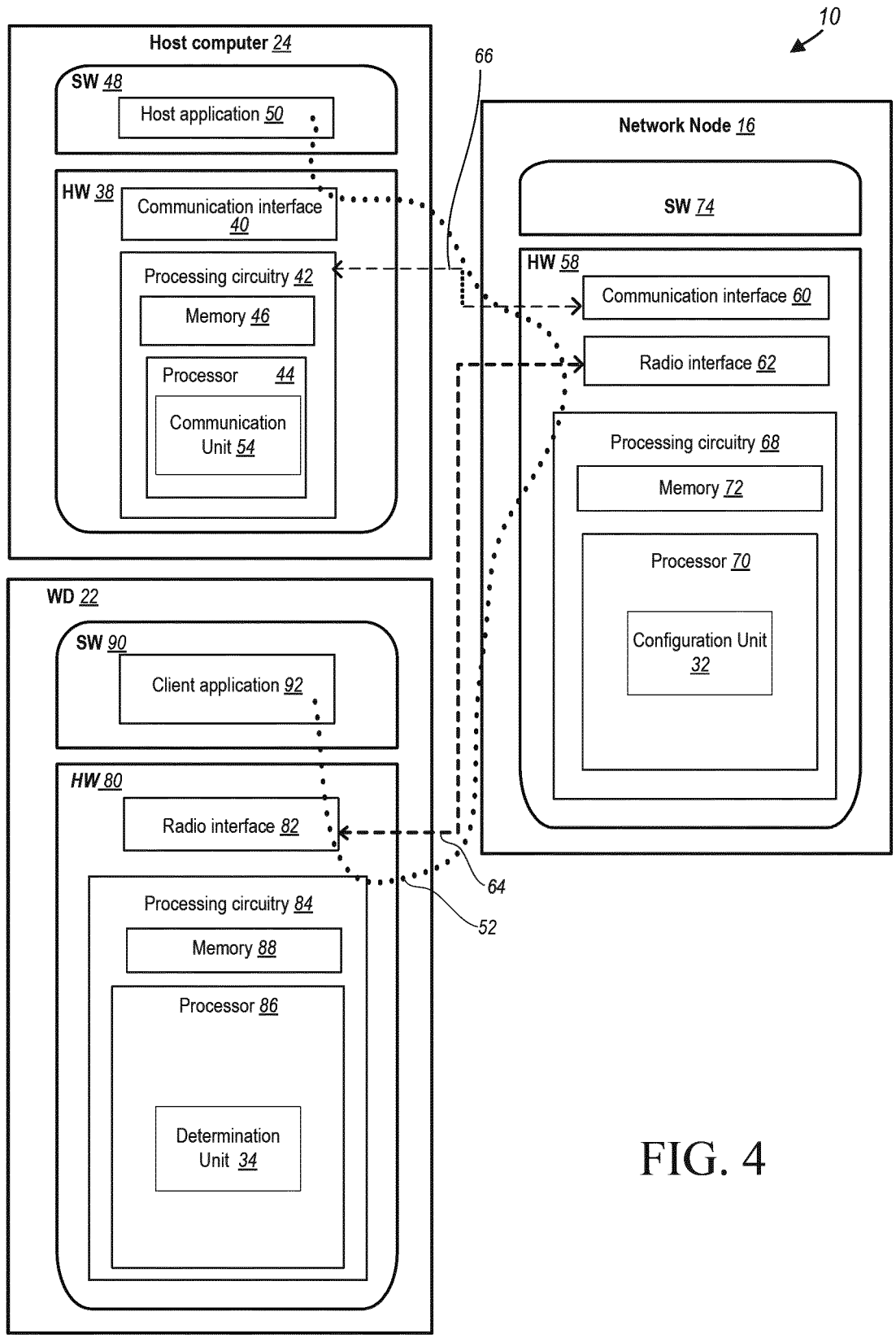
FIG. 4 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as configuration unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
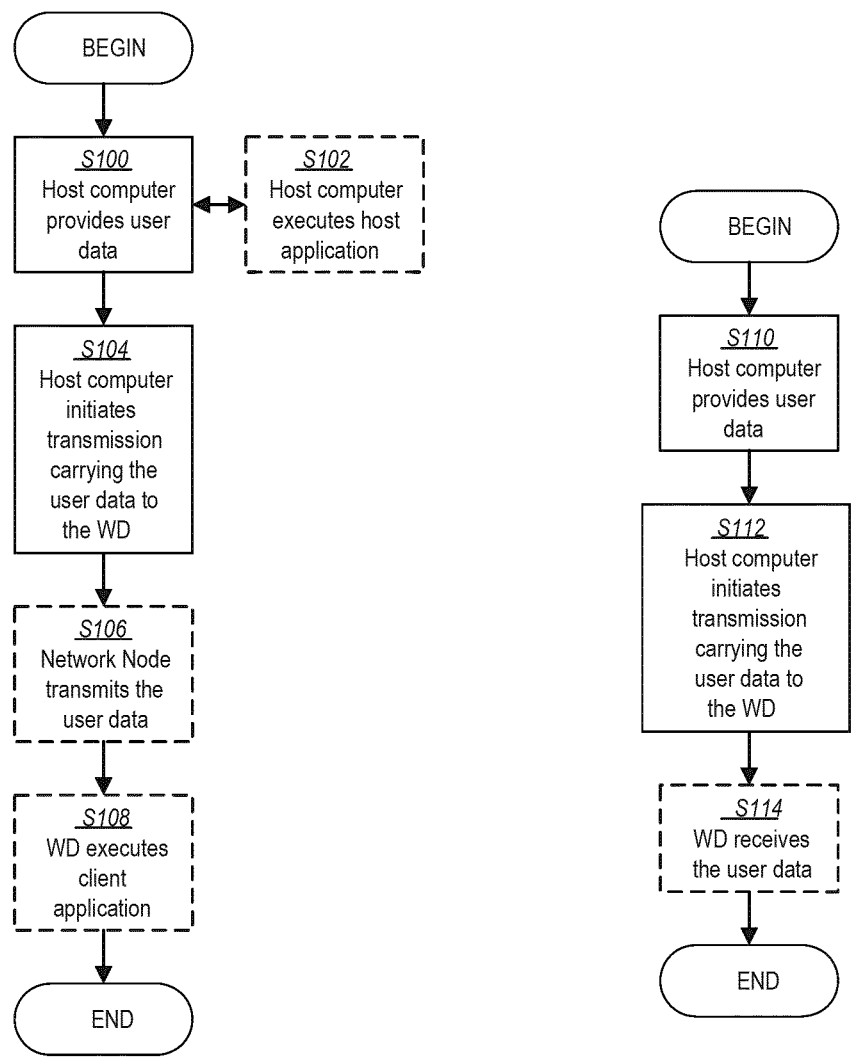
FIG. 5 is a flowchart illustrating exemplary methods implemented in a communication system including a host computer, a network node and a wireless device for executing a client application at a wireless device according to some embodiments of the present disclosure.
FIG. 6 is a flowchart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a wireless device 22, which may be those described with reference to FIG. 4. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the wireless device 22 (block S104). In an optional third step, the network node 16 transmits to the wireless device 22 the user data which was carried in the transmission that the host computer 24 initiated, in accordance with the teachings of the embodiments described throughout this disclosure (block S106). In an optional fourth step, the wireless device 22 executes a client application, such as, for example, the client application 92, associated with the host application 74 executed by the host computer 24 (block S108).

FIG. 6 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the wireless device 22 (block S112). The transmission may pass via the network node 16, in accordance with the teachings of the embodiments described throughout this disclosure. In an optional third step, the wireless device 22 receives the user data carried in the transmission (block S114).

FIG. 7 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, the wireless device 22 receives input data provided by the host computer 24 (block S116). In an optional substep of the first step, the wireless device 22 executes the client application 92, which provides the user data in reaction to the received input data provided by the host computer 24

(block S118). Additionally or alternatively, in an optional second step, the wireless device 22 provides user data (block S120). In an optional substep of the second step, the wireless device provides the user data by executing a client application, such as, for example, client application 92 (block S122). In providing the user data, the executed client application 92 may further consider user input received from the user. Regardless of the specific manner in which the user data was provided, the wireless device 22 may initiate, in an optional third substep, transmission of the user data to the host computer 24 (block S124). In a fourth step of the method, the host computer 24 receives the user data transmitted from the wireless device 22, in accordance with the teachings of the embodiments described throughout this disclosure (block S126).

FIG. 8 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, in accordance with the teachings of the embodiments described throughout this disclosure, the network node 16 receives user data from the wireless device 22 (block S128). In an optional second step, the network node 16 initiates transmission of the received user data to the host computer 24 (block S130). In a third step, the host computer 24 receives the user data carried in the transmission initiated by the network node 16 (block S132).

Figure 9:
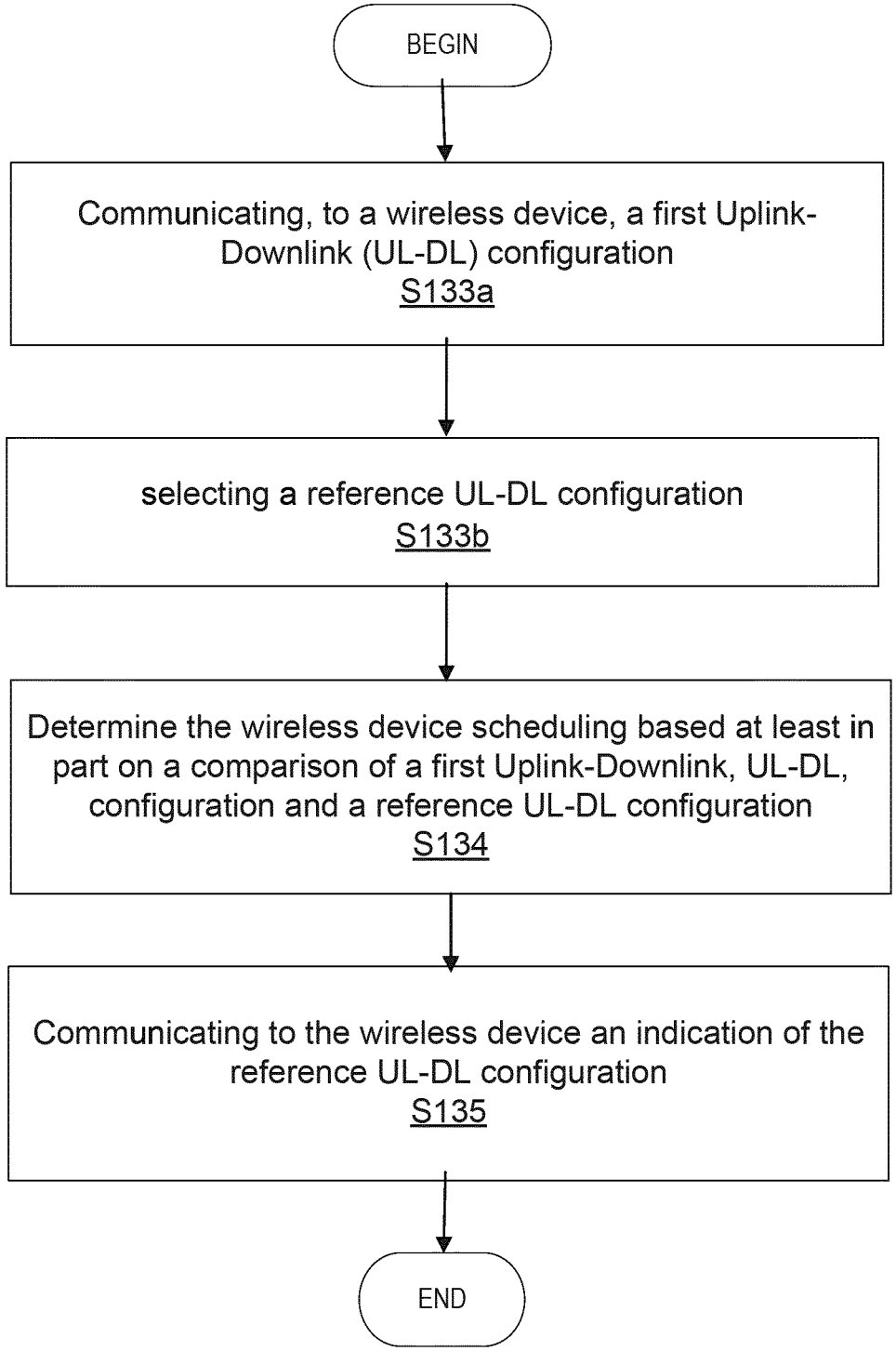
FIG. 9 is a flowchart of an exemplary process in a network node according to some embodiments of the present disclosure.

FIG. 9 is a flowchart of an exemplary process in a network node 16 for when the wireless device 22 is in dual connectivity mode. One or more Blocks and/or functions and/or methods performed by the network node 16 may be performed by one or more elements of network node 16 such as by configuration unit 32 in processing circuitry 68, processor 70, radio interface 62, etc. according to the example method. The example method includes determining (block S134), such as via configuration unit 32, processing circuitry 68 and/or radio interface 62, a wireless device 22 scheduling to use at least one communication resource for one of a Long Term Evolution, LTE, radio access network and a New Radio, NR, access network based at least in part on a comparison of a first Uplink-Downlink, UL-DL, configuration to a reference UL-DL configuration.

In some embodiments, the method further comprises communicating (block S133a), such as via configuration unit 32, processing circuitry 68 and/or radio interface 62, an indication of the first UL-DL configuration, for example in a System Information Block Type 1, SIB1, message. In some embodiments, the reference UL-DL configuration comprises a Long Term Evolution, LTE, reference configuration. In some embodiments, the at least one communication resource comprises a slot or a subframe indicated by the first UL-DL configuration and the reference UL-DL configuration. In some embodiments, the method further comprises communicating (block S133a), to the wireless device 22, an indication of the first Uplink-Downlink, UL-DL, configuration; selecting (block S133b), such as via configuration unit 32, processing circuitry 68 and/or radio interface 62, the reference UL-DL configuration, the reference UL-DL configuration allowing the wireless device to determine, based on a comparison of the first UL-DL configuration to the reference UL-DL configuration, which one of the LTE radio access network and the NR radio access network to use for the at least one scheduled communication resource; and communicating (block S135), such as via configuration unit 32, processing circuitry 68 and/or radio interface 62, to the wireless device 22, an indication of the reference UL-DL configuration.

In some embodiments, the selecting (block S133b) the reference UL-DL configuration further comprises selecting, such as via configuration unit 32, processing circuitry 68 and/or radio interface 62, the reference UL-DL configuration based at least in part on whether a communication direction of the at least one communication resource indicated by the first UL-DL configuration matches a communication direction of the at least one corresponding communication resource indicated by the reference UL-DL configuration. In some embodiments, the selecting (block S133b) the reference UL-DL further comprises: if the at least one communication resource is to be an Uplink, UL, resource for a Long Term Evolution, LTE, radio access network, selecting the reference UL-DL configuration indicating the communication direction of the at least one communication resource that matches the communication direction of the corresponding at least one communication resource indicated by the first UL-DL configuration; and if the at least one communication resource is to be an UL resource for a New Radio, NR, access network, selecting the reference UL-DL configuration indicating the communication direction of the at least one communication resource that does not match the communication direction of the corresponding at least one communication resource indicated by the first UL-DL configuration. In some embodiments, the reference UL-DL configuration further configures a Hybrid Automatic Repeat reQuest, HARQ, timing for the wireless device 22. In some embodiments, the reference UL-DL configuration indicates one of a plurality of Time Division Duplex, TDD, configuration patterns.

In another embodiment, the process comprises communicating, to a wireless device 22, a first Uplink-Downlink (UL-DL) configuration and a second UL-DL configuration, the second UL-DL configuration being a reference UL-DL configuration for configuring at least one communication resource associated with the wireless device 22 as one of an UL resource and a DL resource. In some embodiments, the at least one communication resource is at least one time resource and the communication to the wireless device 22 is for configuring the at least one time resource as one of an UL time resource and a DL time resource in a Time Division Duplex (TDD) frame. In some embodiments, the at least one communication resource is at least one time resource and the communication to the wireless device 22 is for configuring the at least one time resource as one of an UL time resource and a DL time resource in a Time Division Duplex (TDD) frame for scheduling non-overlapping communications when the wireless device 22 is in a Dual Connectivity (DC) mode. In some embodiments, the method further includes selecting the reference UL-DL configuration from a table of a plurality of UL-DL configurations based at least on whether a communication direction of the at least one time resource in the first UL-DL configuration and the second UL-DL configuration matches. In some embodiments, the at least one communication resource is at least one frequency resource and the communication to the wireless device 22 is for configuring the at least one frequency resource for scheduling non-overlapping communications when the wireless device 22 is in a Carrier Aggregation (CA) mode.

Figure 10:
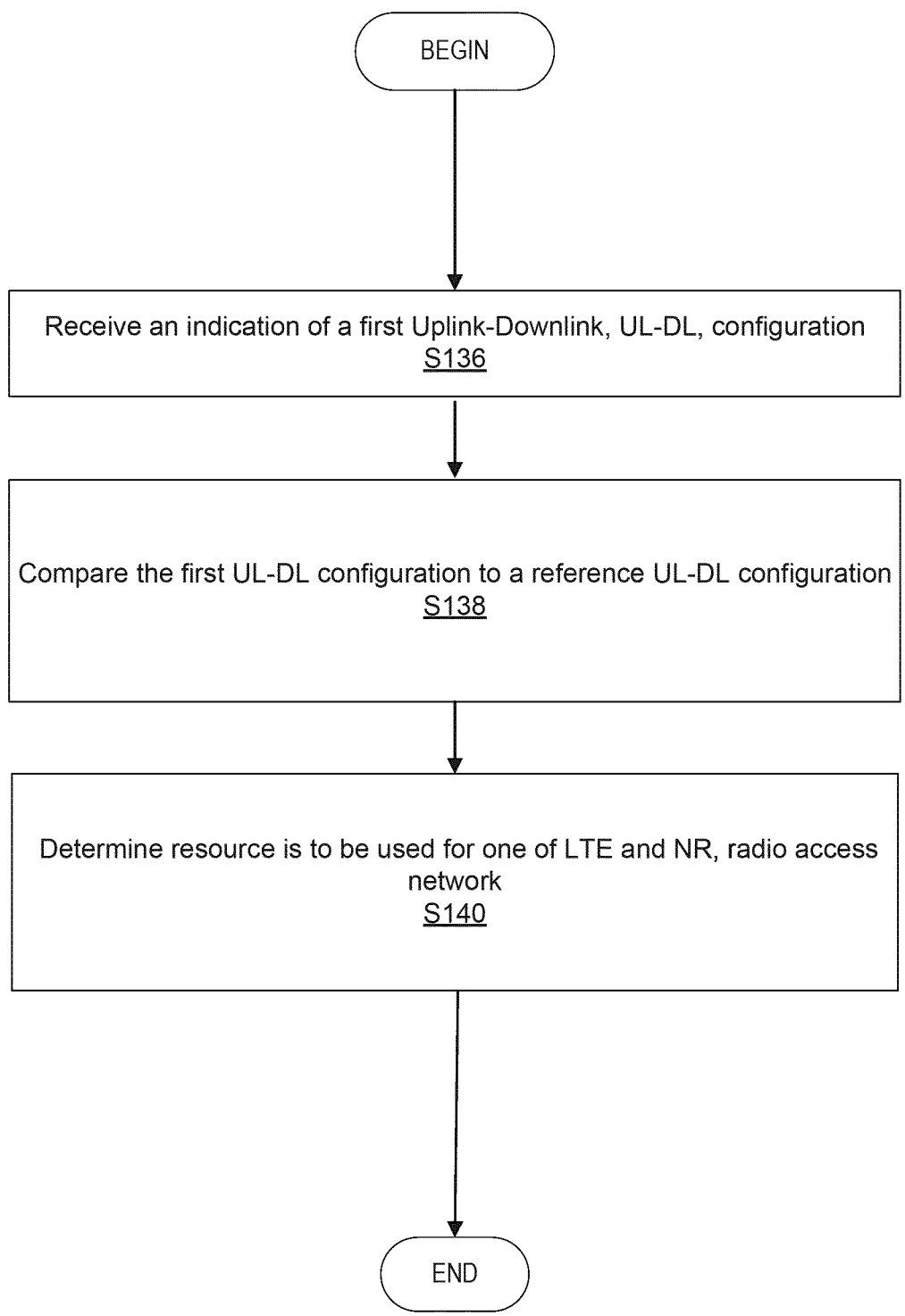
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more Blocks and/or functions and/or methods performed by wireless device 22 may be performed by one or more elements of wireless device 22 such as by determination unit 34 in processing circuitry 84, processor 86, radio interface 82, etc. The example method includes receiving (Block S136), such as via determination unit 34, processing circuitry 84 and/or radio interface 82, an indication of a first Uplink-Downlink, UL-DL, configuration. The method further comprises comparing (Block S138) the first UL-DL configuration to a reference UL-DL configuration to determine whether a communication direction of at least one communication resource indicated by the first UL-DL configuration matches a communication direction of at least one corresponding communication resource indicated by the reference UL-DL configuration. The method further comprises based on the comparison of the reference UL-DL configuration to the first UL-DL configuration, determining (Block S140), such as via determination unit 34, processing circuitry 84 and/or radio interface 82, that the at least one communication resource is to be used for one of a Long Term Evolution, LTE, radio access network and a New Radio, NR, access network.

In some embodiments, the receiving the first UL-DL configuration further comprises receiving, such as via determination unit 34, processing circuitry 84 and/or radio interface 82, the first UL-DL configuration, for example, in a System Information Block Type 1, SIB1, message. In some embodiments, the reference UL-DL configuration comprises a Long Term Evolution, LTE, reference configuration. In some embodiments, the at least one communication resource comprises a slot or a subframe indicated by the first UL-DL configuration and the reference UL-DL configuration. In some embodiments, the method further comprises receiving, such as via determination unit 34, processing circuitry 84 and/or radio interface 82, an indication of the reference UL-DL configuration. In some embodiments, the comparing the reference UL-DL configuration to the first UL-DL configuration further comprises determining, such as via determination unit 34, processing circuitry 84 and/or radio interface 82, whether the communication direction of the at least one communication resource indicated by the first UL-DL configuration and the communication direction of the at least one corresponding communication resource indicated by the reference UL-DL configuration are both Uplink, UL, directions.

In some embodiments, the determining the configuration of the at least one communication resource further comprises: if the communication direction of the at least one communication resource indicated by the first UL-DL configuration and the communication direction of the at least one corresponding communication resource indicated by the reference UL-DL configuration are both Uplink, UL, directions, determining, such as via determination unit 34, processing circuitry 84 and/or radio interface 82, that the at least one communication resource is an UL resource for a Long Term Evolution, LTE, radio access network; if neither the communication direction of the at least one communication resource indicated by the first UL-DL configuration nor the communication direction of the at least one corresponding communication resource indicated by the reference UL-DL configuration are UL directions, determining, such as via determination unit 34, processing circuitry 84 and/or radio interface 82, that the at least one communication resource is a downlink, DL, resource; and if the communication direction of the at least one communication resource indicated by the first UL-DL configuration is an UL direction and the communication direction of the at least one corresponding communication resource indicated by the reference UL-DL configuration is not an UL direction, determining, such as via determination unit 34, processing circuitry 84 and/or radio interface 82, that the at least one communication resource is an UL resource for a New Radio, NR, access network.

In some embodiments, the determining the configuration of the at least one communication resource further comprises, based on the comparison of the reference UL-DL configuration to the first UL-DL configuration, determining, such as via determination unit 34, processing circuitry 84 and/or radio interface 82, a Hybrid Automatic Repeat reQuest, HARQ, timing. In some embodiments, the reference UL-DL configuration indicates one of a plurality of Time Division Duplex, TDD, configuration patterns.

In another embodiment, a method implemented in the wireless device 22 comprises receiving, from a network node 16, a first Uplink-Downlink (UL-DL) configuration and a second UL-DL configuration, the second UL-DL configuration being a reference UL-DL configuration and determining that at least one communication resource for the wireless device 22 is one of an UL resource and a DL resource based on a comparison of at least the first UL-DL configuration and the reference UL-DL configuration. In some embodiments, the at least one communication resource is at least one time resource and the determining includes determining that the at least one time resource is one of an UL time resource and a DL time resource in a Time Division Duplex (TDD) frame. In some embodiments, the at least one communication resource is at least one time resource and the determining comprises determining that the at least one time resource is one of an UL time resource and a DL time resource in a Time Division Duplex (TDD) frame for scheduling non-overlapping communications when the wireless device 22 is in a Dual Connectivity (DC) mode. In some embodiments, the method further comprising comparing the reference UL-DL configuration to the first UL-DL configuration to determine whether a communication direction of the at least one time resource in the first UL-DL configuration and the second UL-DL configuration matches. In some embodiments, the at least one communication resource is at least one frequency resource and the determining comprises determining a frequency corresponding to the at least one frequency resource for scheduling non-overlapping communications when the wireless device 22 is in a Carrier Aggregation (CA) mode.

Having generally described some embodiments of the present disclosure, a more detailed description of some such embodiments is provided below.

Consider a first example scenario when a single carrier on the LTE side is operating with TDD. In such scenario, either option 3/3A or option 4/4A may be used, e.g., that the Dual connectivity is used between LTE and NR with one or more carriers on the NR side. Option 4/4A may be an option for when NR is the MCG and LTE is the SCG and Option 3/3A may be for when LTE is the MCG and NR is the SCG.

A problem may arise when both the NR and LTE side are operating with TDD. In many practical deployments the same TDD pattern (i.e., pattern of UL/DL transmissions) may exist for both LTE and NR. This maybe the case when, for example, NR is operated within LTE frequency bands. The same UL/DL configuration may in such a case be operated throughout the whole frequency band. In other words, it may be that all operators in that band use the same configuration independent of the technology. Further, there may be a 15 kHz subcarrier spacing on the NR side. For 30 kHz subcarrier spacing, the pattern (e.g., UL/DL configuration subframe pattern) may be similar but not the same because each slot (e.g., time slot) on the NR side may be 0.5 ms instead of 1 ms in length. In some embodiments, the pattern can then be extended to reflect this fact (e.g., by replacing a 1 ms slot applicable in a particular UL/DL direction with two consecutive 0.5 ms slots where the 1 ms slot corresponds to 15 kHz subcarrier spacing and 0.5 ms slot corresponds to 30 kHz subcarrier spacing).

In some embodiments, the applicable TDD configuration in LTE may be shown in the following table (Table 1) where the UL-DL configuration is indicated by an UL-DL configuration number or indicator which corresponds to the predefined TDD subframe configuration:

TABLE 1

| Uplink-downlink Configuration (indicator) | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In some embodiments, it may be assumed or determined that an LTE carrier is operating UL/DL configuration 1 (as shown in Table 1 above). The configuration may be broadcasted through system information (e.g., SIB) by e.g. network node 16. Similarly, on the NR side a configuration mimicking configuration 1 may be operated by, for example, the network node 16, e.g., gNB. In some embodiments, for the NR side, there may be a notation change based on subframe-to-slot (NR and LTE terminology may be different) plus modification to the subcarrier spacing if appropriate. Note also that there may be no special subframe in NR, but there may be slot(s) wherein the switch between DL and UL is configured to occur (which is considered the function of the "special subframe" in LTE). Note also that, in Tables 1-5, 'D' indicates a DL subframe/slot, 'U' indicates an UL subframe/slot and 'S' indicates that the subframe/slot is a "special subframe" or similar subframe for switching between DL and UL.

Furthermore, it may be assumed that both NR and LTE are operating 15 kHz subcarrier spacing. The UL and DL patterns may be as shown in the following table (Table 2):

TABLE 2

| Downlink-to-Uplink Switch-point periodicity | Subframe/slot number | | | | | | | | | |
|---|---|---|---|---|---|---|---|---|---|---|
| | 0 | 1 | 2 | 3 | 4 | 5 | 6 | 7 | 8 | 9 |
| LTE | D | S | U | U | D | D | S | U | U | D |
| NR | D | S | U | U | D | D | S | U | U | D |

As can be seen from Table 2, in this example, both LTE and NR show a subframe/slot number pattern corresponding to configuration 1 from Table 1. If there is no case 1 timing configured, from a power control perspective, the network may configure a static maximum power on both NR and LTE side that such that the total maximum power across LTE side and NR side does not exceed a maximum output power threshold. One can, for example, split the power by half between NR and LTE. This may have the direct consequence that the coverage may become smaller on both LTE and NR. Another alternative is that the wireless device 22 may support dynamic power sharing so that the wireless device 22 can scale down LTE or NR if the allocated power exceeds the maximum output power threshold of the wireless device 22. This threshold may be a predetermined threshold.

An alternative to this may be provided by the following embodiment. In such embodiment, the wireless device 22 may be configured, such as by network node 16, with a UL/DL reference configuration on the LTE side. For this case, in some embodiments, we may assume that the LTE and the reference configuration is applicable for the Pcell or Primary Scell (PScell) (depending on the operation of the LTE cell). This reference configuration for the example above can, for example, have the same UL/DL subframe pattern as configuration 2. The resulting configuration may appear as follows in Table 3:

TABLE 3

| Downlink-to-Uplink Switch-point periodicity | Subframe/slot number | | | | | | | | | |
|---|---|---|---|---|---|---|---|---|---|---|
| | 0 | 1 | 2 | 3 | 4 | 5 | 6 | 7 | 8 | 9 |
| LTE | D | S | U | U | D | D | S | U | U | D |
| LTE reference config. | D | S | U | D | D | D | S | U | D | D |
| NR | D | S | U | U | D | D | S | U | U | D |

As can be seen in Table 3, there is an LTE reference configuration corresponding to configuration 2 of Table 1. Such reference configuration may used to derive the UL subframe(s) that are used for UL for the wireless device 22 on the LTE side. This may correspond to subframe 2 and 7, for example, because subframe/slot numbers 2 and 7 are configured as UL for LTE, LTE reference configuration and NR (as shown in Table 3), unlike the other subframe/slot numbers in Table 3. Further, the reference configuration can be used to derive DL HARQ timings (i.e., the timing to transmit HARQ-ACK in uplink in response to receiving a PDSCH in downlink). The wireless device 22 may, after being configured with the reference configuration, assume that only subframe 2 and 7 are used for LTE transmissions in the UL. The wireless device 22 may assume that subframes that have different directions between the LTE SIB configured UL/DL configuration (row corresponding to "LTE" in Table 3 above) and the LTE reference configuration (row corresponding to "LTE reference config." In Table 3 above) are not used by LTE. In the example above this is subframe 3 and 8. In some embodiments, for those subframes (i.e., the slots corresponding to those subframes on NR side) the wireless device 22 can however assume that NR can use them in UL (row corresponding to "NR" in Table 3 above). This may allow the network (e.g., network node 16) to schedule non-overlapping UL transmissions for LTE and NR. In some implementations, with the above example, the wireless device 22 may use subframes 2 and 7 for LTE transmissions in the UL and subframes 3 and 8 for NR in the UL.

For subframes that have different directions between the LTE SIB configured UL/DL configuration and the LTE reference configuration, i.e., subframes 3 and 8 the above example, the wireless device 22 can exclude those subframes while performing measurements such as Reference Signal Received Signal/Reference Signal Received Quality (RSRP/RSRQ) measurements on DL reference signals such as Cell-Specific Reference Signal (CRS) on the LTE side. In some embodiments, the wireless device 22 may also skip monitoring LTE DL control channel i.e., LTE PDCCH on those NR UL subframes (e.g., subframe 3 and 8 in this example). In some embodiments, the wireless device 22 may also assume that Physical HARQ Indicator Channel (PHICH) resources corresponding to those subframes are not used (e.g., the wireless device 22 can skip decoding those PHICH resources, or assume that an ACK is transmitted on them).

The SIB configured UL/DL configuration can be received by the wireless device 22 in SystemInformationBlock1 (SIB1) for example. The reference UL/DL configuration can be received by the wireless device 22 via dedicated Radio Resource Control (RRC) signaling from e.g., network node 16, in some embodiments.

Another possible reference configuration is configuration 4 or configuration 5 of, for example, Table 1 for the specific case above. The resulting configuration may be as follows in Table 4, which uses a reference configuration corresponding to configuration 4 from Table 1:

TABLE 4

| Downlink-to-Uplink Switch-point | Subframe/slot number | | | | | | | | | |
|---|---|---|---|---|---|---|---|---|---|---|
| periodicity | 0 | 1 | 2 | 3 | 4 | 5 | 6 | 7 | 8 | 9 |
| LTE | D | S | U | U | D | D | S | U | U | D |
| LTE reference config 4 | D | S | U | U | D | D | D | D | D | D |
| NR | D | S | U | U | D | D | S | U | U | D |

For this example, the UL subframe used by LTE after being configured with the reference configuration is subframe 2 and 3 in the example (e.g., since subframe numbers 2 and 3 are UL subframes for all of the UL/DL configurations (LTE, LTE reference config, and NR). NR can use subframe/slot number 7 and 8 for UL transmissions since subframe/slot numbers 7 and 8 have different directions (UL and DL) for the configurations in those corresponding subframe/slot numbers. It should be understood that some embodiments may have configurations organized into subframe numbers and other embodiments may have configurations organized into slot numbers, hence the terminology "subframe/slot number."

Table 5 below illustrates an embodiment in which the reference configuration corresponds to configuration 5 from Table 1.

TABLE 5

| Downlink-to-Uplink Switch-point | Subframe/slot number | | | | | | | | | |
|---|---|---|---|---|---|---|---|---|---|---|
| periodicity | 0 | 1 | 2 | 3 | 4 | 5 | 6 | 7 | 8 | 9 |
| LTE | D | S | U | U | D | D | S | U | U | D |
| LTE reference config 5 | D | S | U | D | D | D | D | D | D | D |
| NR | D | S | U | U | D | D | S | U | U | D |

For this example, the UL subframe used by LTE may be subframe 2. NR can use slot number 3, 7 and 8 for UL transmissions. Specifically, the network (e.g., network node 16) may configure the wireless device 22 with a given reference configuration (e.g., via RRC signaling, or other control signaling) directly among the available reference configurations, such as, for example, the reference configurations shown in Table 1. In an example described later the reference configuration can be different for UL and DL.

For the UL, the same method can be used, i.e., a reference configuration can be directly configured to the wireless device 22 by the network node 16 or radio node (e.g., eNB).

More generally, in some embodiments, the wireless device 22 can be configured with a DL-reference configuration based on which the timing for wireless device 22 to transmit HARQ-ACK in uplink in response to receiving a PDSCH in downlink is derived. The wireless device 22 can also be configured with an UL-reference configuration based on which the timing for the wireless device 22 to transmit PUSCH in uplink in response to receiving a PDDCH UL grant in downlink is derived. In such embodiments, the applicable UL subframes may be derived based on the DL reference timing.

For the above scenario(s), the special subframe on the LTE side can either be operated by the NR side in UL, in some embodiment, or the LTE side, in other embodiments.

The applicable reference configuration can be derived by known methods, e.g., for configuration 1 in DL the applicable configuration in DL are 2, 4 and 5. For UL the applicable configurations are {6 and 0} following the same mechanism, as described above with reference to UL configurations.

In second embodiment, the same and/or similar mechanisms and processes may be applied to Carrier Aggregation (CA) operation.

For CA operation on the LTE side the following mechanism may be applied in some embodiments. For the only FDD carriers, a single UL/DL reference configuration may be configured that applies to all the LTE carriers at the same time. The reference configuration may be used to derive the applicable UL subframes for LTE usage and the DL HARQ timings. In some embodiments, this may be applied in the PCell or PScell.

In embodiments where one or multiple carries are TDD carriers on the LTE side, the wireless device 22 may be similarly configured with a single UL/DL reference configuration in DL that is used to derive the applicable UL subframes for LTE transmission. If it is so that the UL/DL configurations that are used on the TDD carriers from, for example, the SIB1 signaling (i.e., not the configured reference configuration) the applicable configurable reference configurations among the multiple carriers may be determined according to known techniques.

In addition, some embodiments may include one or more of the following:

Example A1. A network node configured to communicate with a wireless device (wireless device), the network node configured to, and/or comprising a radio interface and/or comprising processing circuitry configured to:

communicate, to the wireless device, a first Uplink-Downlink (UL-DL) configuration and a second UL-DL configuration, the second UL-DL configuration being a reference UL-DL configuration for configuring at least one communication resource associated with the wireless device as one of an UL resource and a DL resource.

Example A2. The network node of Example A1, wherein the at least one communication resource is at least one time resource and the communication to the wireless device is for configuring the at least one time resource as one of an UL time resource and a DL time resource in a Time Division Duplex (TDD) frame.

Example A3. The network node of Example A1, wherein the at least one communication resource is at least one time resource and the communication to the wireless device is for configuring the at least one time resource as one of an UL time resource and a DL time resource in a Time Division Duplex (TDD) frame for scheduling non-overlapping communications when the wireless device is in a Dual Connectivity (DC) mode.

Example A4. The network node of any of Examples A1-A3, wherein the processing circuitry is further configured to select the reference UL-DL configuration from a table of a plurality of UL-DL configurations based at least on whether a communication direction of the at least one time resource in the first UL-DL configuration and the second UL-DL configuration matches.

Example A5. The network node of Example A1, wherein the at least one communication resource is at least one frequency resource and the communication to the wireless device is for configuring the at least one frequency resource for scheduling non-overlapping communications when the wireless device is in a Carrier Aggregation (CA) mode.

Example B1. A method implemented in a network node, the method comprising communicating, to a wireless device (wireless device), a first Uplink-Downlink (UL-DL) configuration and a second UL-DL configuration, the second UL-DL configuration being a reference UL-DL configuration for configuring at least one communication resource associated with the wireless device as one of an UL resource and a DL resource.

Example B2. The method of Example B1, wherein the at least one communication resource is at least one time resource and the communication to the wireless device is for configuring the at least one time resource as one of an UL time resource and a DL time resource in a Time Division Duplex (TDD) frame.

Example B3. The method of Example B1, wherein the at least one communication resource is at least one time resource and the communication to the wireless device is for configuring the at least one time resource as one of an UL time resource and a DL time resource in a Time Division Duplex (TDD) frame for scheduling non-overlapping communications when the wireless device is in a Dual Connectivity (DC) mode.

Example B4. The method of any of Examples B1-B3, further comprising selecting the reference UL-DL configuration from a table of a plurality of UL-DL configurations based at least on whether a communication direction of the at least one time resource in the first UL-DL configuration and the second UL-DL configuration matches.

Example B5. The method of Example B1, wherein the at least one communication resource is at least one frequency resource and the communication to the wireless device is for configuring the at least one frequency resource for scheduling non-overlapping communications when the wireless device is in a Carrier Aggregation (CA) mode.

Example C1. A wireless device (wireless device) configured to communicate with a network node, the wireless device configured to, and/or comprising a radio interface and/or processing circuitry configured to:

receive, from a network node, a first Uplink-Downlink (UL-DL) configuration and a second UL-DL configuration, the second UL-DL configuration being a reference UL-DL configuration; and determine that at least one communication resource for the wireless device is one of an UL resource and a DL resource based on a comparison of at least the first UL-DL configuration and the reference UL-DL configuration.

Example C2. The wireless device of Example C1, wherein the at least one communication resource is at least one time resource and the processing circuitry is configured to determine that the at least one time resource is one of an UL time resource and a DL time resource in a Time Division Duplex (TDD) frame.

Example C3. The wireless device of Example C1, wherein the at least one communication resource is at least one time resource and the processing circuitry is configured to determine that the at least one time resource is one of an UL time resource and a DL time resource in a Time Division Duplex (TDD) frame for scheduling non-overlapping communications when the wireless device is in a Dual Connectivity (DC) mode.

Example C4. The wireless device of any of Examples C1-C3, wherein the processing circuitry is further configured to compare the reference UL-DL configuration to the first UL-DL configuration to determine whether a communication direction of the at least one time resource in the first UL-DL configuration and the second UL-DL configuration matches.

Example C5. The wireless device of Example C1, wherein the at least one communication resource is at least one frequency resource and the processing circuitry is configured to determine a frequency corresponding to the at least one frequency resource for scheduling non-overlapping communications when the wireless device is in a Carrier Aggregation (CA) mode.

Example D1. A method implemented in a wireless device (wireless device), the method comprising:

receiving, from a network node, a first Uplink-Downlink (UL-DL) configuration and a second UL-DL configuration, the second UL-DL configuration being a reference UL-DL configuration; and determining that at least one communication resource for the wireless device is one of an UL resource and a DL resource based on a comparison of at least the first UL-DL configuration and the reference UL-DL configuration.

Example D2. The method of Example D1, wherein the at least one communication resource is at least one time resource and the determining comprises determining that the at least one time resource is one of an UL time resource and a DL time resource in a Time Division Duplex (TDD) frame.

Example D3. The method of Example D1, wherein the at least one communication resource is at least one time resource and the determining comprises determining that the at least one time resource is one of an UL time resource and a DL time resource in a Time Division Duplex (TDD) frame for scheduling non-overlapping communications when the wireless device is in a Dual Connectivity (DC) mode.

Example D4. The method of any of Examples D1-D3, further comprising comparing the reference UL-DL configuration to the first UL-DL configuration to determine whether a communication direction of the at least one time resource in the first UL-DL configuration and the second UL-DL configuration matches.

Example D5. The method of Example D1, wherein the at least one communication resource is at least one frequency resource and the determining comprises determining a frequency corresponding to the at least one frequency resource for scheduling non-overlapping communications when the wireless device is in a Carrier Aggregation (CA) mode.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device for communicating with a network node, the wireless device-comprising processing circuitry, the processing circuitry configured to, for a dual connectivity mode of the wireless device:
   receive, in a System Information Block Type 1, SIB1, message, an indication of a first Uplink-Downlink, UL-DL, configuration;
   receive an indication of the reference UL-DL configuration;
   compare the first UL-DL configuration to a reference UL-DL configuration, the reference UL-DL configuration indicating one of a plurality of Time Division Duplex, TDD, configuration patterns, and determine whether a communication direction of at least one communication resource indicated in the first UL-DL configuration matches a communication direction of at least one corresponding communication resource indicated by the reference UL-DL configuration; and
   based on the comparison of the reference UL-DL configuration to the first UL-DL configuration, determine whether the at least one communication resource is to be used for one of a Long Term Evolution, LTE, radio access network or a New Radio, NR, access network.

2. The wireless device of claim 1, wherein the at least one communication resource comprises a slot or a subframe indicated by the first UL-DL configuration and the reference UL-DL configuration.

3. The wireless device of claim 1, wherein the processing circuitry is further configured to compare the reference UL-DL configuration to the first UL-DL configuration by being configured to:
   determine whether the communication direction of the at least one communication resource indicated by the first UL-DL configuration and the communication direction of the at least one corresponding communication resource indicated by the reference UL-DL configuration are both Uplink, UL, directions.

4. The wireless device of claim 1, wherein the processing circuitry is further configured to determine the configuration of the at least one communication resource by being configured to:
   if the communication direction of the at least one communication resource indicated by the first UL-DL configuration and the communication direction of the at least one corresponding communication resource indicated by the reference UL-DL configuration are both Uplink, UL, directions, determine that the at least one communication resource is an UL resource for a Long Term Evolution, LTE, radio access network;
   if neither the communication direction of the at least one communication resource indicated by the first UL-DL configuration nor the communication direction of the at least one corresponding communication resource indicated by the reference UL-DL configuration are UL directions, determine that the at least one communication resource is a DL resource; and
   if the communication direction of the at least one communication resource indicated by the first UL-DL configuration is an UL direction and the communication direction of the at least one corresponding communication resource indicated by the reference UL-DL configuration is not an UL direction, determine that the at least one communication resource is an UL resource for a New Radio, NR, access network.

5. The wireless device of claim 1, wherein the processing circuitry is further configured to determine the configuration of the at least one communication resource by being configured to:
   based on the comparison of the reference UL-DL configuration to the first UL-DL configuration, determine a Hybrid Automatic Repeat reQuest, HARQ, timing.

6. A method in a wireless device, the method comprising, for a dual connectivity mode of the wireless device:
   receiving, in a System Information Block Type 1, SIB1, message, an indication of a first Uplink-Downlink, UL-DL, configuration;
   receiving an indication of the reference UL-DL configuration;
   comparing the first UL-DL configuration to a reference UL-DL configuration, the reference UL-DL configuration indicating one of a plurality of Time Division Duplex, TDD, configuration patterns, to determine whether a communication direction of at least one communication resource indicated by the first UL-DL configuration matches a communication direction of at least one corresponding communication resource indicated by the reference UL-DL configuration; and
   based on the comparison of the reference UL-DL configuration to the first UL-DL configuration, determining whether the at least one communication resource is to be used for a Long Term Evolution, LTE, radio access network or a New Radio, NR, access network.

7. The method of claim 6, wherein the at least one communication resource comprises a slot or a subframe indicated by the first UL-DL configuration and the reference UL-DL configuration.

8. The method of claim 6, wherein the comparing the reference UL-DL configuration to the first UL-DL configuration further comprises:
   determining whether the communication direction of the at least one communication resource indicated by the first UL-DL configuration and the communication direction of the at least one corresponding communication resource indicated by the reference UL-DL configuration are both Uplink, UL, directions.

9. The method of claim 6, wherein the determining the configuration of the at least one communication resource further comprises:
   if the communication direction of the at least one communication resource indicated by the first UL-DL configuration and the communication direction of the at least one corresponding communication resource indicated by the reference UL-DL configuration are both Uplink, UL, directions, determining that the at least one communication resource is an UL resource for a Long Term Evolution, LTE, radio access network;
   if neither the communication direction of the at least one communication resource indicated by the first UL-DL configuration nor the communication direction of the at least one corresponding communication resource indicated by the reference UL-DL configuration are UL directions, determining that the at least one communication resource is a downlink, DL, resource; and
   if the communication direction of the at least one communication resource indicated by the first UL-DL configuration is an UL direction and the communication direction of the at least one corresponding communication resource indicated by the reference UL-DL configuration is not an UL direction, determining that the at least one communication resource is an UL resource for a New Radio, NR, access network.

10. The method of claim 6, wherein the determining the configuration of the at least one communication resource further comprises:
    based on the comparison of the reference UL-DL configuration to the first UL-DL configuration, determining a Hybrid Automatic Repeat reQuest, HARQ, timing.

11. A network node configured to communicate with a wireless device when the wireless device is in dual connectivity mode, the network node comprising processing circuitry, the processing circuitry configured to:
    determine the wireless device scheduling to use at least one communication resource for one of either a Long Term Evolution, LTE, radio access network or a New Radio, NR, access network based at least in part on a comparison of a first Uplink-Downlink, UL-DL, configuration to a reference UL-DL configuration;
    communicate the first UL-DL configuration in a System Information Block Type 1, SIB1, message;
    select the reference UL-DL configuration, the reference UL-DL configuration indicating one of a plurality of Time Division Duplex, TDD, configuration patterns, the reference UL-DL configuration allowing the wireless device to determine, based on a comparison of the first UL-DL configuration to the reference UL-DL configuration, which one of the LTE radio access network and the NR radio access network to use for the at least one scheduled communication resource; and communicate, to the wireless device, an indication of the reference UL-DL configuration.

12. A method in a network node, the method comprising:
determining a wireless device scheduling to use at least one communication resource for one of either a Long Term Evolution, LTE, radio access network or a New Radio, NR, access network based at least in part on a comparison of a first Uplink-Downlink, UL-DL, configuration to a reference UL-DL configuration; and
communicating an indication of the first UL-DL configuration in a System Information Block Type 1, SIB1, message;
selecting the reference UL-DL configuration, the reference UL-DL configuration indicating one of a plurality of Time Division Duplex, TDD, configuration patterns, the reference UL-DL configuration allowing the wireless device to determine, based on a comparison of the first UL-DL configuration to the reference UL-DL configuration, which one of the LTE radio access network and the NR radio access network to use for the at least one scheduled communication resource; and
communicating, to the wireless device, an indication of the reference UL-DL configuration.

13. The method of claim 12, wherein the at least one communication resource comprises a slot or a subframe indicated by the first UL-DL configuration and the reference UL-DL configuration.

14. The method of claim 12, wherein the selecting the reference UL-DL configuration further comprises:
selecting the reference UL-DL configuration based at least in part on whether a communication direction of the at least one communication resource indicated by the first UL-DL configuration matches a communication direction of the at least one corresponding communication resource indicated by the reference UL-DL configuration.

15. The method of claim 12, wherein the selecting the reference UL-DL further comprises:
if the at least one communication resource is to be an Uplink, UL, resource for a Long Term Evolution, LTE, radio access network, selecting the reference UL-DL configuration indicating the communication direction of the at least one communication resource that matches the communication direction of the corresponding at least one communication resource indicated by the first UL-DL configuration; and
if the at least one communication resource is to be an UL resource for a New Radio, NR, access network, selecting the reference UL-DL configuration indicating the communication direction of the at least one communication resource that does not match the communication direction of the corresponding at least one communication resource indicated by the first UL-DL configuration.

16. The method of claim 12, wherein the reference UL-DL configuration further configures a Hybrid Automatic Repeat reQuest, HARQ, timing for the wireless device.

17. The wireless device of claim 1, wherein the processing circuitry is further configured to determine the configuration of the at least one communication resource by being configured to:
if the communication direction of the at least one communication resource indicated by the first UL-DL configuration and the communication direction of the at least one corresponding communication resource indicated by the reference UL-DL configuration are both UL directions, determine that the at least one communication resource is an UL resource for the LTE radio access network; and
otherwise determine that the at least one communication resource is an UL or DL resource for the NR access network.

18. The method of claim 6, further comprising determining the configuration of the at least one communication resource by being configured to:
if the communication direction of the at least one communication resource indicated by the first UL-DL configuration and the communication direction of the at least one corresponding communication resource indicated by the reference UL-DL configuration are both UL directions, determine that the at least one communication resource is an UL resource for the LTE radio access network; and
otherwise determine that the at least one communication resource is an UL or DL resource for the NR access network.

* * * * *